US009754689B2

(12) United States Patent
Ueyama et al.

(10) Patent No.: US 9,754,689 B2
(45) Date of Patent: Sep. 5, 2017

(54) RADIATION SOURCE REDUCING SYSTEM AND METHOD FOR NUCLEAR POWER PLANT

(71) Applicant: THE JAPAN ATOMIC POWER COMPANY, Tokyo (JP)

(72) Inventors: Yutaka Ueyama, Tokyo (JP); Wataru Sugino, Tokyo (JP)

(73) Assignee: THE JAPAN ATOMIC POWER COMPANY, Tokyo (JP)

( * ) Notice: Subject to any disclaimer, the term of this patent is extended or adjusted under 35 U.S.C. 154(b) by 357 days.

(21) Appl. No.: 14/386,156

(22) PCT Filed: Mar. 25, 2013

(86) PCT No.: PCT/JP2013/002007
§ 371 (c)(1),
(2) Date: Sep. 18, 2014

(87) PCT Pub. No.: WO2013/145691
PCT Pub. Date: Oct. 3, 2013

(65) Prior Publication Data
US 2015/0085967 A1 Mar. 26, 2015

(30) Foreign Application Priority Data
Mar. 26, 2012 (JP) .................. 2012-069877

(51) Int. Cl.
*G21C 17/022* (2006.01)
*G21D 3/08* (2006.01)
*C02F 101/00* (2006.01)
*C02F 103/02* (2006.01)

(52) U.S. Cl.
CPC ........... *G21C 17/0225* (2013.01); *G21D 3/08* (2013.01); *C02F 2101/006* (2013.01);
(Continued)

(58) Field of Classification Search
CPC .................. G21C 17/0225; G21D 3/08; C02F 2101/006; C02F 2103/023; C02F 2305/04
(Continued)

(56) References Cited

U.S. PATENT DOCUMENTS

| 5,864,596 A | 1/1999 | Egerbrecht et al. |
| 2002/0012414 A1 | 1/2002 | Egebrecht et al. |

(Continued)

FOREIGN PATENT DOCUMENTS

| JP | 3-267797 | * 11/1991 | ........... G21C 19/307 |
| JP | 2003-529048 | 9/2003 | |

(Continued)

OTHER PUBLICATIONS

Holba, "Improved Analytical Analysis of a Pressurized Water Reactor Secondary Loop", (2011), All Capstone Projects, 76.*
(Continued)

*Primary Examiner* — Peter M Poon
*Assistant Examiner* — Daniel Wasil
(74) *Attorney, Agent, or Firm* — Wenderoth, Lind & Ponack, L.L.P.

(57) ABSTRACT

A radiation source reducing system and method for nuclear power plants whereby radiation source can be reduced are provided. The radiation source reducing system for nuclear power plants includes a dispersant injecting unit, which injects a dispersant into a coolant of a nuclear power plant coolant system. The dispersant is polyacrylic acid, and has an average molecular weight in a range of 16000 to 26000, inclusive.

5 Claims, 8 Drawing Sheets

(52) U.S. Cl.
CPC .... *C02F 2103/023* (2013.01); *C02F 2305/04* (2013.01); *Y02E 30/40* (2013.01)

(58) Field of Classification Search
USPC ......................................................... 376/306
See application file for complete search history.

(56) References Cited

U.S. PATENT DOCUMENTS

| | | | |
|---|---|---|---|
| 2010/0135450 A1* | 6/2010 | Fruzzetti | G21C 17/0225 376/306 |
| 2010/0300218 A1* | 12/2010 | Fruzzetti | F28G 9/00 210/701 |
| 2013/0251086 A1 | 9/2013 | Speranzini et al. | |

FOREIGN PATENT DOCUMENTS

| | | | | |
|---|---|---|---|---|
| JP | 2007-304111 | | 11/2007 | |
| JP | 2010-43956 | | 2/2010 | |
| WO | 98/03051 | | 1/1998 | |
| WO | 01/11935 | | 2/2001 | |
| WO | 2012/009781 | | 1/2012 | |
| WO | WO 2012/009781 | * | 1/2012 | ............... G21F 9/28 |

OTHER PUBLICATIONS

Extended European Search Report Issued Oct. 22, 2015 in corresponding Application No. 13769302.4.
International Search Report (ISR) dated May 14, 2013 in International Application No. PCT/JP2013/002007.

* cited by examiner

RADIATION SOURCE REDUCING SYSTEM AND METHOD FOR NUCLEAR POWER PLANT

TECHNICAL FIELD

The present invention relates to a radiation source reducing system and method for a nuclear power plant in which a radiation source can be reduced by injecting a dispersant into a coolant of a nuclear power plant.

BACKGROUND ART

In a primary system of a pressurized water reactor-type nuclear power plant (hereinafter referred to as PWR) and a primary system of a boiling water reactor-type nuclear power plant (hereinafter referred to as BWR), which have been operated for an extended period of time, radioactive CRUD may be deposited, and radioactive nuclide may be incorporated into an oxide film on a surface of primary system piping and instrument. The radioactive CRUD and the radioactive nuclide incorporated into the oxide film are radiation sources and cause exposure to radiation. For this reason, it is preferable that the radioactive CRUD and the radioactive nuclide incorporated into the oxide film be removed as much as possible.

Since the 1980s, the radiation dose of a nuclear power plant has tended to reduce smoothly. However, in recent years, a reduction in the radiation dose has been stopped. Therefore, in addition to conventional dose reduction measures, additional measure has been desired.

To a primary system of a conventional nuclear power plant, zinc injection has been applied for a reduction in radiation exposure. The application of zinc injection takes a certain effect for a reduction in the dose rate of primary system instrument and piping (for example, see Patent Literature 1).

CITATION LIST

Patent Literature

Patent Literature 1: Japanese Patent Application Laid-Open No. 2010-43956

Technical Problem

However, in addition to the zinc injection which is a technique in Patent Literature 1, another technique is required for the reduction in radiation exposure. In the BWR in which the concentration of iron in feedwater is high, an effect of zinc injection may be lower. Further, an up-rating, long-term cycle operation, and the like which are investigated to be applied in the future may cause an increase in the dose. Therefore, an additional measure for the reduction in radiation exposure is required.

SUMMARY OF THE INVENTION

The present invention has been made to solve the conventional problems. The present invention provides a radiation source reducing system and method for a nuclear power plant in which a dispersant is injected into a coolant of the nuclear power plant to remove radioactive CRUD stacked in the nuclear power plant and a radioactive nuclide incorporated into an oxide film, thereby reducing radiation sources.

Solution to Problem

The present invention is a radiation source reducing system for a nuclear power plant, including a dispersant injecting unit for injecting a dispersant into a coolant of a coolant system of the nuclear power plant.

The present invention is also a radiation source reducing method for a nuclear power plant, including injecting a dispersant into a coolant of a coolant system of the nuclear power plant.

Advantageous Effects of Invention

According to the present invention, radiation sources can be reduced by injecting a dispersant into a coolant of a nuclear power plant to remove radioactive CRUD stacked in the nuclear power plant and radioactive nuclide incorporated into an oxide film.

DETAILED DESCRIPTION OF THE INVENTION

Figure 1:
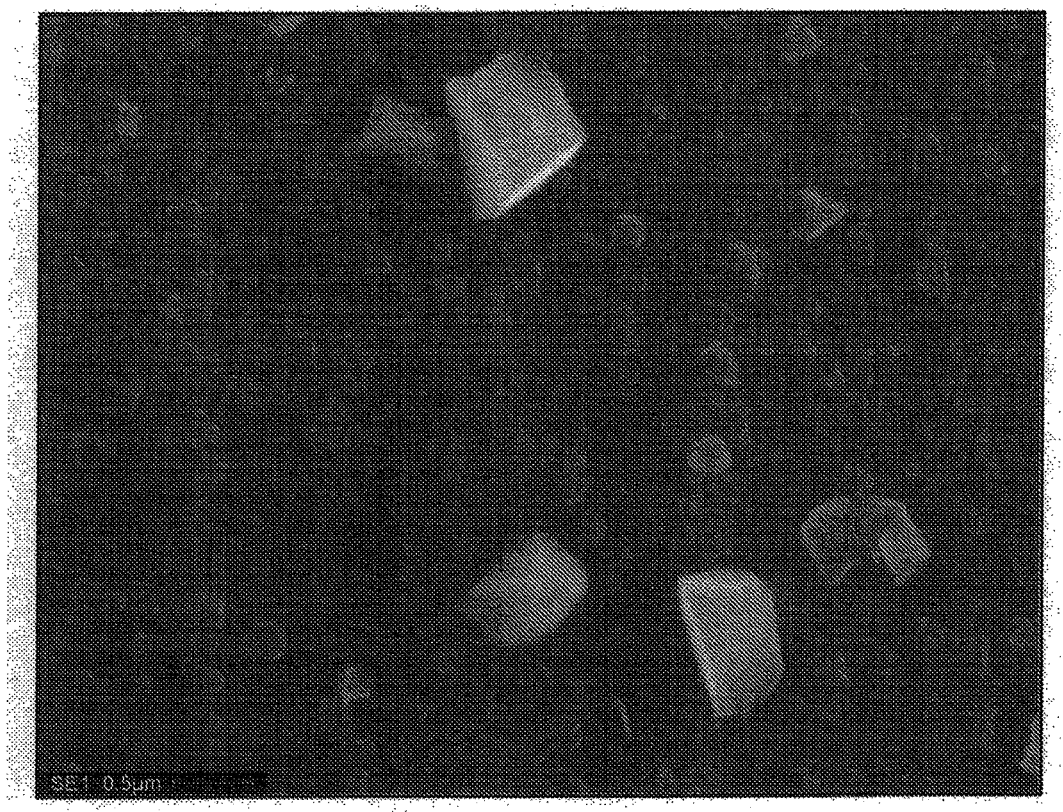
FIG. 1 is a view showing a SEM image of surface of an INCONEL 600 specimen after a test T1.

Hereinafter, a radiation source reducing system and method for a nuclear power plant which are each an embodiment of the present invention, will be described in detail.

A configuration of a primary coolant system of a general PWR nuclear power station and a flow of a primary coolant will be simply described.

In the PWR nuclear power station, a forced circulation cycle system composed of a double cycle of primary and secondary systems is standard. In the PWR nuclear power station, primary cooling water (reactor coolant) which is unboiling high-temperature and high-pressure water is produced in a reactor core of a reactor vessel, and transferred to the inside of a heat transfer tube in a steam generator by a primary coolant pump. The pressure of the primary system is controlled and maintained by a pressurizer.

The radiation source reducing system for a nuclear power plant according to the present embodiment has a dispersant injecting unit for injecting a dispersant into a primary coolant in a coolant system of a PWR nuclear power plant. The dispersant represents a chemical of converting a solid into fine particles and dispersing them in a liquid. The dispersant is generally an organic polymer. Examples thereof may include a dispersant of stabilizing particles by electrostatic interaction (anionic dispersant) and a dispersant of stabilizing particles by steric protection (nonionic dispersant).

In this embodiment, the dispersant is injected into the primary system to efficiently remove metal (Ni, Fe, Cr, Co, etc.) which may become the radiation sources of the primary system, and CRUD and an oxide film which contain the radiation sources and are attached to a fuel, an instrument, and a piping. Thus, the radiation sources of the nuclear power plant can be reduced.

When the nuclear power plant is a PWR, it is preferable that the dispersant injecting unit of the present embodiment be connected to a piping of a primary coolant system of the PWR nuclear power plant. Thus, the radiation dose of primary instrument and piping can be reduced.

A point of the primary coolant system of a PWR capable of being connected to the dispersant injecting unit of the present embodiment is a volume control tank (VCT) of a chemical volume control system (CVCS) as an example.

It is preferable that the dispersant of the present embodiment be, for example, polyacrylic acid (PAA), polyvinylpyrrolidone (PVP), or a maleic acid polymer. In this case, accumulation of a corrosion product on a boiling heat transfer surface can be effectively prevented. The dispersant of the present embodiment may be used alone or in combination with another chemicals (for example, zinc). As the dispersant, EDTA or amino acid may be used since they are chemicals having the same effect.

It is desirable that the dispersant of the present embodiment do not contain an impurity component. This is because when the dispersant contains an impurity component, the impurity component may be decomposed in the reactor to affect a construction in the reactor. In particular, it is preferable that the dispersant do not contain any component of sodium, chloride, sulfur, and fluorine as the impurity component. This can suppress the corrosion of a piping member or the like caused by sodium or the like.

In the present embodiment described above, a method for injecting a dispersant into a primary coolant system of a PWR is described, but the embodiment is not limited to the method. The embodiment can be applied to a BWR. For example, a point of a coolant system of a BWR capable of being connected to the dispersant injecting unit of the present embodiment is an outlet of a reactor coolant cleanup system (CUW) and an outlet of a high-pressure condensate pump.

As described above, according to the radiation source reducing system and method for a nuclear power plant of the present embodiment, radioactive CRUD deposited in the nuclear power plant and radioactive nuclide incorporated into an oxide film can be reduced by injecting a dispersant into a coolant of the nuclear power plant. Thus, the radiation sources of the nuclear power plant can be reduced.

EXAMPLES

Hereinafter, the present invention will be described more specifically with reference to Examples. However, the present invention is not limited to the examples.
(Screening Test)

In evaluation of a dispersant in Examples, a plate specimen having an oxide film formed on a surface thereof was immersed in an aqueous solution of the dispersant in each of Examples 1 to 8 at room temperature for 168 hours, and the amount of metal eluted in the aqueous solution (metal concentration) was evaluated.

As the plate specimen, two kinds of SUS316L (18 mm×18 mm×1 mm in thickness) and INCONEL (registered trademark, hereinafter is the same) 600 (18 mm×18 mm×1.57 mm in thickness) were used. The specimen was immersed in an aqueous solution containing 10 ppb Ni for 1,000 hours, and then in an aqueous solution containing 10 ppb Ni and 10 ppb Co for 1,000 hours to form an oxide film on the surface of the specimen. The amount of eluted metal of four kinds of Ni, Fe, Cr, and Co was measured. The amount of the eluted metal was measured by atomic absorption spectroscopy.

Example 1

As a dispersant, polyacrylic acid (PAA) having an average molecular weight of 16,000 was used. The dispersant was added to an aqueous solution so that the concentration of the dispersant was 1 ppm, and the amount of metal eluted in the aqueous solution was evaluated.

Example 2

As a dispersant, polyacrylic acid (PAA) having an average molecular weight of 26,000 was used. The dispersant was added to an aqueous solution so that the concentration of the dispersant was 1 ppm, and the amount of metal eluted in the aqueous solution was evaluated.

Example 3

As a dispersant, polyvinylpyrrolidone (PVP) having an average molecular weight of 60,000 was used. The dispersant was added to an aqueous solution so that the concentration of the dispersant was 1 ppm, and the amount of metal eluted in the aqueous solution was evaluated.

Example 4

As a dispersant, a maleic acid polymer having an average molecular weight of 5,500 was used. The dispersant was added to an aqueous solution so that the concentration of the dispersant was 1 ppm, and the amount of metal eluted in the aqueous solution was evaluated.

Example 5

As a dispersant, polyacrylic acid (PAA) having an average molecular weight of 16,000 was used. The dispersant was added to an aqueous solution so that the concentration of the dispersant was 50 ppb, and the amount of metal eluted in the aqueous solution was evaluated.

Example 6

As a dispersant, polyacrylic acid (PAA) having an average molecular weight of 26,000 was used. The dispersant was added to an aqueous solution so that the concentration of the dispersant was 50 ppb, and the amount of metal eluted in the aqueous solution was evaluated.

Example 7

As a dispersant, polyvinylpyrrolidone (PVP) having an average molecular weight of 60,000 was used. The dispersant was added to an aqueous solution so that the concentration of the dispersant was 50 ppb, and the amount of metal eluted in the aqueous solution was evaluated.

Example 8

As a dispersant, a maleic acid polymer having an average molecular weight of 5,500 was used. The dispersant was added to an aqueous solution so that the concentration of the dispersant was 50 ppb, and the amount of metal eluted in the aqueous solution was evaluated.

Comparative Example 1

In Comparative Example 1, the amount of metal eluted was evaluated without use of a dispersant.

Table 1 shows the concentration of metal eluted from the SUS316L specimen. ("-" in Table represents a detection limit or less of atomic absorption spectroscopy.)

TABLE 1

| | CONDITION (LIQUID AMOUNT: 20 ml) | | | | | |
|---|---|---|---|---|---|---|
| | DISPERSANT | | CONCENTRATION OF ELUTED METAL (ppb) | | | |
| TEST | (AVERAGE MOLECULAR WEIGHT) | CONCENTRATION | Ni | Fe | Cr | Co |
| EXAMPLE 1 | PAA (16,000) | 1 ppm | 6.875 | 60.63 | — | 6.025 |
| EXAMPLE 2 | PAA (26,000) | 1 ppm | 7.025 | 57.25 | — | — |
| EXAMPLE 3 | PVP (60,000) | 1 ppm | 7.025 | 66.90 | — | — |
| EXAMPLE 4 | MALEIC ACID POLYMER (5,500) | 1 ppm | 6.575 | 70.93 | — | — |
| EXAMPLE 5 | PAA (16,000) | 50 ppb | 5.550 | 129.90 | 2.675 | — |
| EXAMPLE 6 | PAA (26,000) | 50 ppb | 4.425 | 58.00 | — | — |
| EXAMPLE 7 | PVP (60,000) | 50 ppb | 5.075 | 61.53 | — | — |
| EXAMPLE 8 | MALEIC ACID POLYMER (5,500) | 50 ppb | 4.875 | 73.85 | 2.450 | — |
| COMPARATIVE EXAMPLE 1 | NONE | — | 5.925 | 47.575 | — | — |

As seen from Table 1, a main element eluted from SUS316L is Fe, and Ni is also eluted slightly. The amount of Fe eluted increases even by addition of each dispersant (Examples 1 to 8) as compared with no addition (Comparative Example 1).

The amount of Ni eluted increases by addition of each of the dispersants of Examples 1 to 4 as compared with no addition (Comparative Example 1). Accordingly, it is preferable that the concentration of the dispersant be 1 ppm from the viewpoint of elution of Fe and Ni.

The concentrations of Cr and Co eluted from SUS316L are a detection limit or less under most conditions, whereas a significantly large amount of Co is eluted only in Example 1. For this reason, by using the dispersant PAA (16,000) of Example 1, removal of $^{58}$Ni which is a parent nuclide of $^{58}$Co and $^{60}$Co and $^{58}$Co which are radiation sources is expected. Therefore, it is more preferable that PAA (16,000) be used as the dispersant and the concentration of the dispersant be 1 ppm from the viewpoint of elution of Fe, Ni, and Co.

Table 2 shows the concentration of metal eluted from INCONEL 600. ("-" in Table represents a detection limit or less of atomic absorption spectroscopy.)

undermost conditions. Further, a main element eluted from INCONEL 600 is Ni, and a large amount of Fe is also eluted therefrom. The amount of Fe eluted increases even by addition of each dispersant (Examples 1 to 8) as compared with no addition (Comparative Example 1). In particular, the amount of Fe eluted increases during the addition in a concentration of 50 ppb (Examples 5 to 8).

The amount of Ni eluted increases by addition of each of the dispersants of Examples 1 to 4 and 7 as compared with no addition (Comparative Example 1). Accordingly, it is preferable that the concentration of the dispersant be 1 ppm from the viewpoint of elution of Fe and Ni.

From the evaluation, it is confirmed that the dispersants obtained in Examples 1 to 8 of the present invention promote the elution of metal element as the radiation source. Therefore, the effectiveness of the present invention is demonstrated.

(Corrosion Test in High-Temperature and High-Pressure Water)

A corrosion test of INCONEL 600 was performed in high-temperature and high-pressure water at 320° C. using a facility for evaluation test of non-stationary corrosion behavior. As a basic water quality in the corrosion test, the concentration of B is 280 ppm, the concentration of Li is 2 ppm, the concentration of dissolved hydrogen (DH) of 30

TABLE 2

| | CONDITION (LIQUID AMOUNT: 20 ml) | | | | | |
|---|---|---|---|---|---|---|
| | DISPERSANT | | CONCENTRATION OF ELUTED METAL (ppb) | | | |
| TEST | (AVERAGE MOLECULAR WEIGHT) | CONCENTRATION | Ni | Fe | Cr | Co |
| EXAMPLE 1 | PAA (16,000) | 1 ppm | 218.08 | 29.90 | — | — |
| EXAMPLE 2 | PAA (26,000) | 1 ppm | 253.08 | 25.23 | — | — |
| EXAMPLE 3 | PVP (60,000) | 1 ppm | 205.58 | 21.23 | — | — |
| EXAMPLE 4 | MALEIC ACID POLYMER (5,500) | 1 ppm | 154.75 | 19.55 | — | — |
| EXAMPLE 5 | PAA (16,000) | 50 ppb | 107.3 | 47.38 | — | — |
| EXAMPLE 6 | PAA (26,000) | 50 ppb | 128.6 | 65.35 | — | — |
| EXAMPLE 7 | PVP (60,000) | 50 ppb | 157.1 | 36.98 | — | — |
| EXAMPLE 8 | MALEIC ACID POLYMER (5,500) | 50 ppb | 117.8 | 31.88 | — | — |
| COMPARATIVE EXAMPLE 1 | NONE | — | 139.75 | 17.10 | — | — |

As seen from Table 2, the concentrations of Cr and Co eluted from INCONEL 600 are a detection limit or less cc/kg, and the concentration of dissolved oxygen (DO) is 5 ppb or less. A test condition is shown in Table 3.

TABLE 3

| TEST | WATER QUALITY | SPECIMEN | TIME |
| --- | --- | --- | --- |
| T1 | Ni 10 ppb | INCONEL 600 (20 × 20 × 2 IN THICKNESS) 8 SHEETS<br>INCONEL 600 (18 × 18 × 1.57 IN THICKNESS) 21 SHEETS | 1000 h |
| T2 | Ni 10 ppb + Co 10 ppb | INCONEL 600 (20 × 20 × 2 IN THICKNESS) 2 SHEETS<br>INCONEL 600 (18 × 18 × 1.57 IN THICKNESS) 15 SHEETS | 1000 h |
| T3 | Ni 10 ppb + Co 10 ppb + PAA (16,000) 50 ppb | INCONEL 600 (WITH PREFORMED FILM, EACH SIZE 2 SHEETS) | 1000 h |
| T4 | Ni 10 ppb + Co 10 ppb + Zn 5 ppb + PAA (16,000) 50 ppb | INCONEL 600 (WITH PREFORMED FILM, EACH SIZE 2 SHEETS) | 1000 h |

Tests T1 and T2 aim at formation of a preformed film and accumulation of a metal oxide on the surface of a specimen. In the formation of a preformed film in Examples, 10 ppb of Ni was usually added.

Further, an effect expected by addition of a dispersant to a primary system of a PWR is removal of a radioactive corrosion product. From the viewpoint of radiation exposure, the most important radioactive corrosion product is $^{58}$Co and $^{60}$Co, of which the elements are Co. In the test T2, Co was added to test water.

By the screening test, polyacrylic acid (average molecular weight: 16,000) (PAA(16,000)) was judgedtobebest, and polyacrylic acid was used in tests T3 and T4.

In the tests T3 and T4, the INCONEL 600 plate specimen in which the preformed film had been formed in the tests T1 and T2 was used. The tests T3 and T4 aim at observation of change of the metal oxide on the surface of the specimen by the dispersant. The specimens immersed in the tests T1 and T2 were the same. The plate specimens in the tests T3 and T4 were plate specimens in which the preformed film had been formed in the tests T1 and T2.

An oxide film produced on the surface of the specimen was analyzed after the corrosion test in high-temperature and high-pressure water. The surface configuration of the plate specimen (INCONEL 600) was observed with a SEM and the element distribution in a depth direction was analyzed by glow discharge spectroscopy (GDS). The distribution in the depth direction of six elements of Ni, Fe, Cr, Co, Zn, and C was analyzed by GDS.

Figure 2:
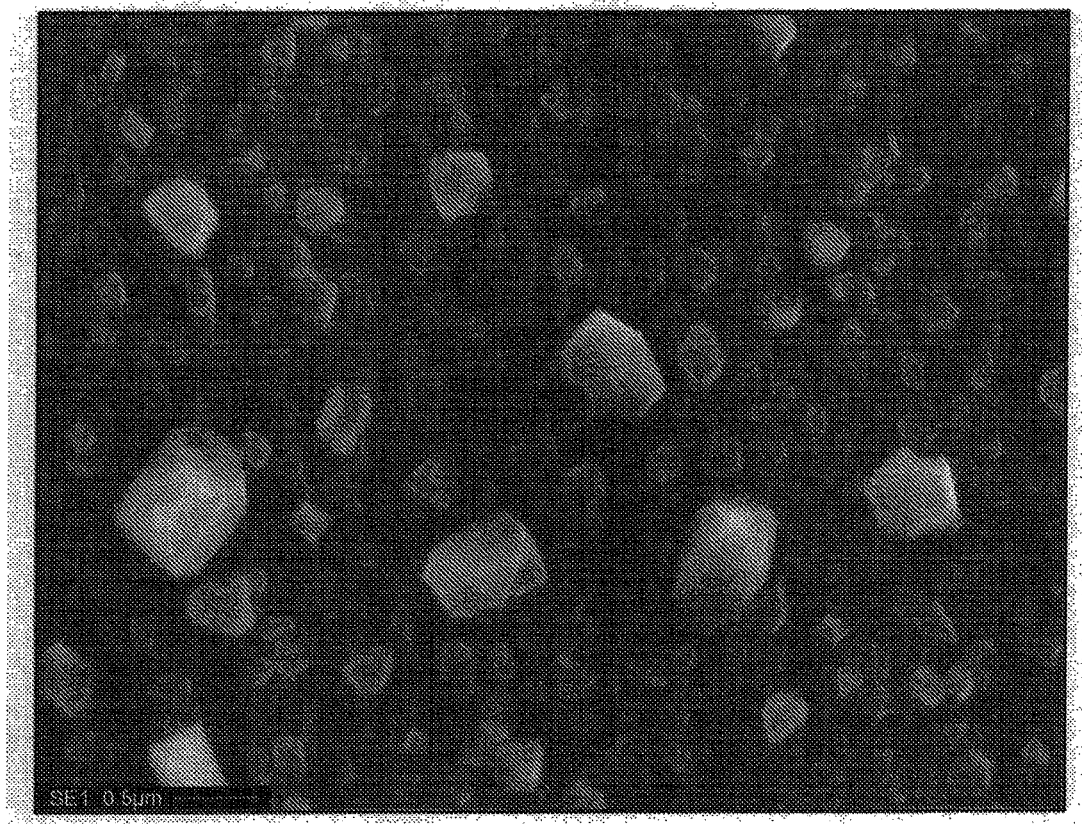
FIG. 2 is a view showing a SEM image of surface of the INCONEL 600 specimen after a test T1→T2.
Figure 3:
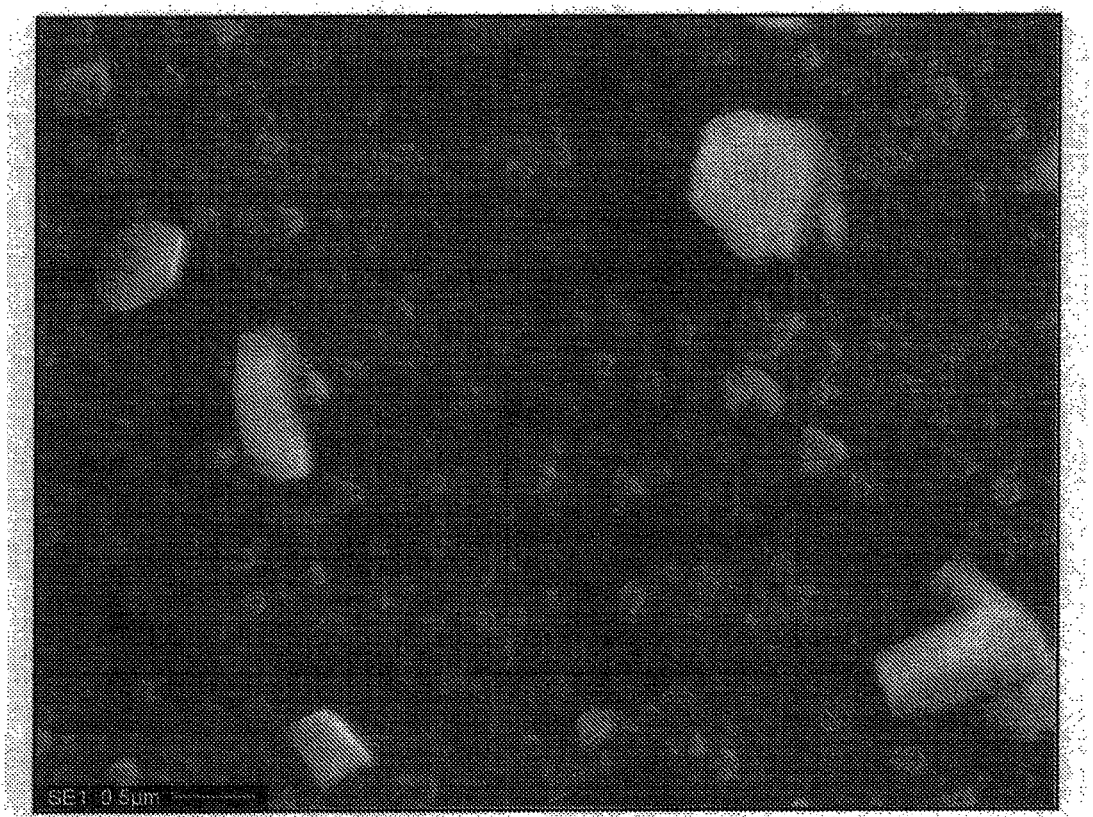
FIG. 3 is a view showing a SEM image of surface of the INCONEL 600 specimen after a test T1→T2→T3.
Figure 4:
FIG. 4 is a view showing a SEM image of surface of the INCONEL 600 specimen after a test T1→T2→T4.

FIGS. 1 to 4 show SEM images of surface of the INCONEL 600 specimens after the test T1, after the test T1→T2, after the test T1→T2→T3, and after the test T1→T2→T4, respectively.

A metal oxide crystal is often observed on the surface of only the specimen after the test T1→T2. It is considered that a metal oxide crystal is not produced or grown much in 1,000 hours of the test T1, but the number of the metal oxide crystal increases in 1,000 hours of the subsequent test T2. After the tests T3 and 4T of addition of the dispersant, the number of the metal oxide crystal clearly decreases. It is considered reasonable that this result may be derived by the removal thereof due to the dispersant.

Figure 5:
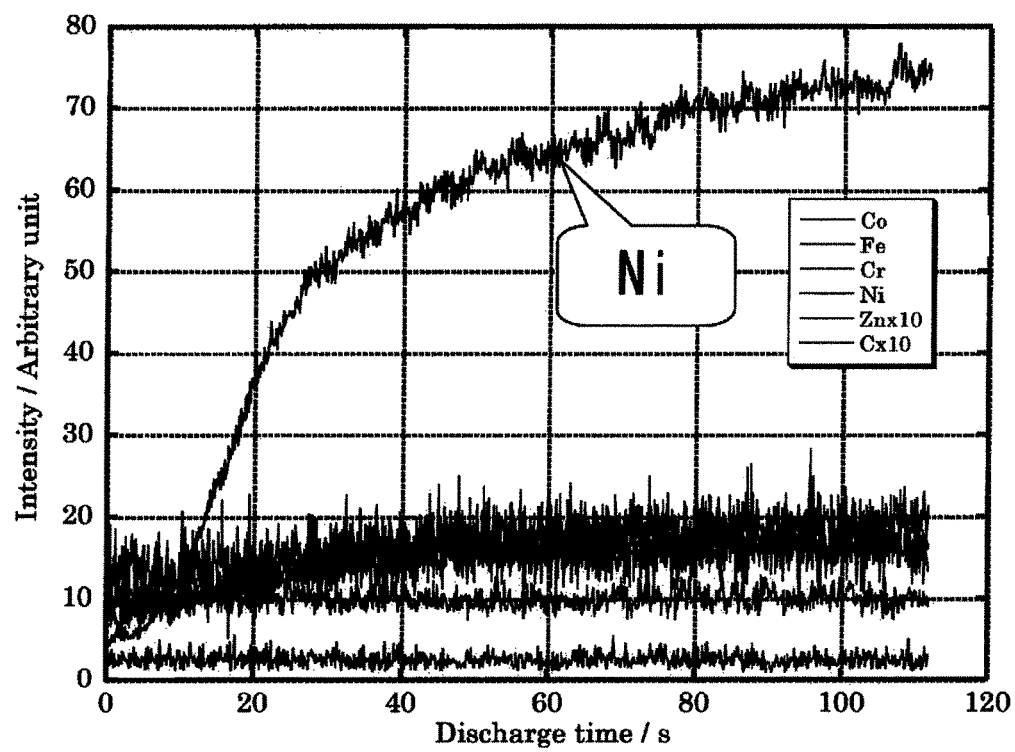
FIG. 5 is a view illustrating a GDS result of the INCONEL 600 specimen after the test T1.
Figure 6:
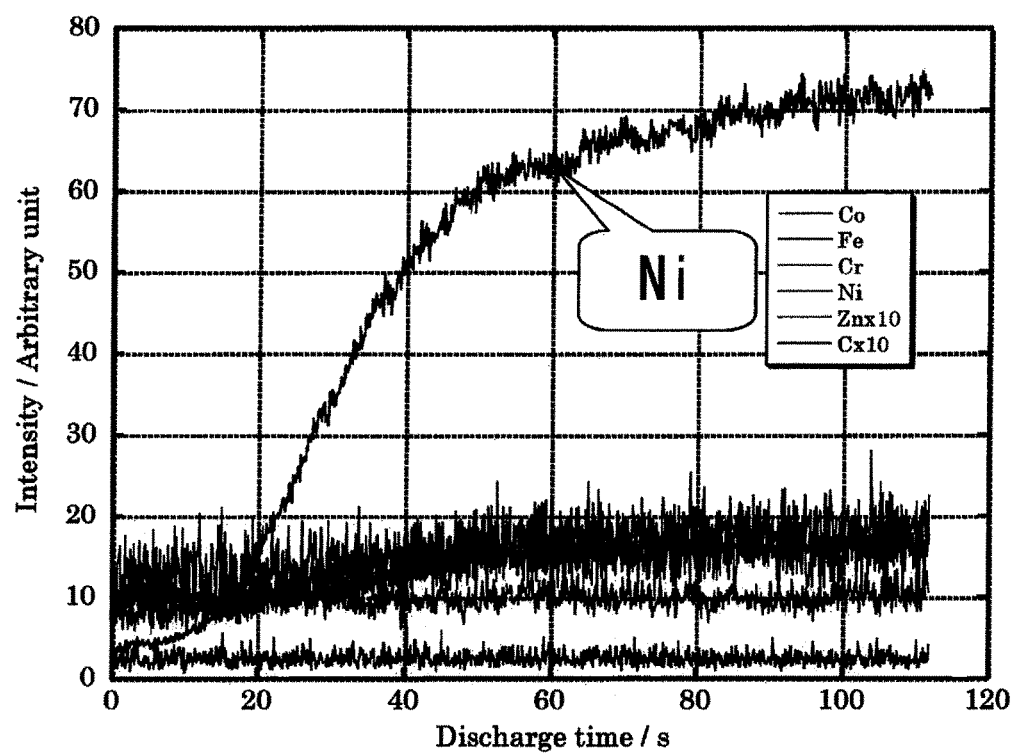
FIG. 6 is a view illustrating a GDS result of the INCONEL 600 specimen after the test T1→T2.
Figure 7:
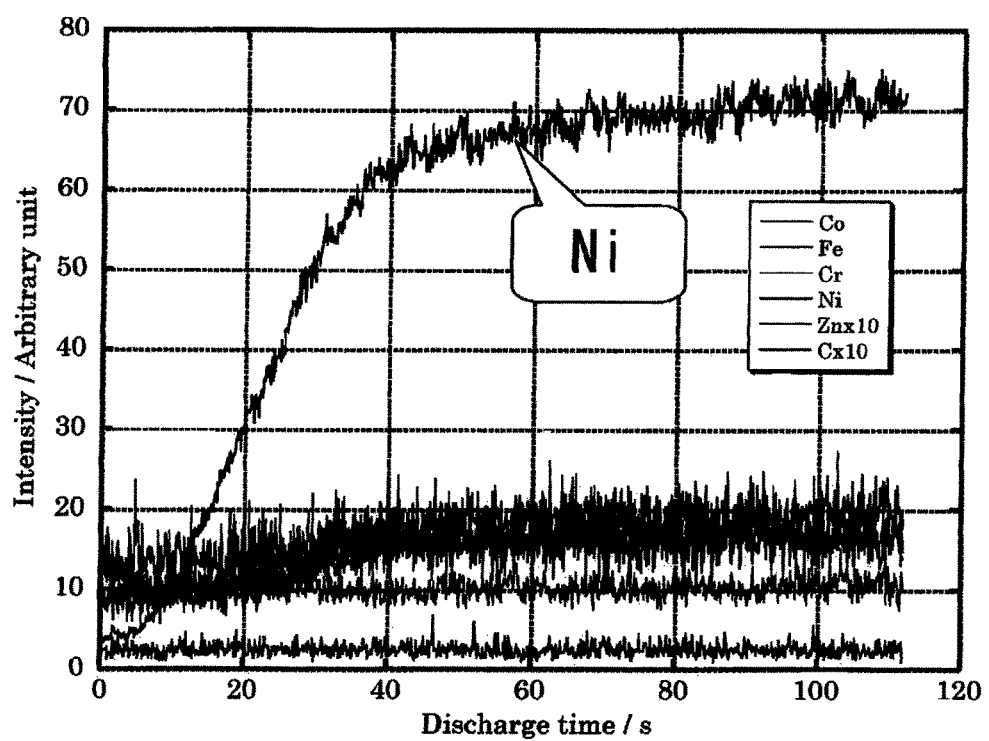
FIG. 7 is a view illustrating a GDS result of the INCONEL 600 specimen after the test T1→T2→T3.
Figure 8:
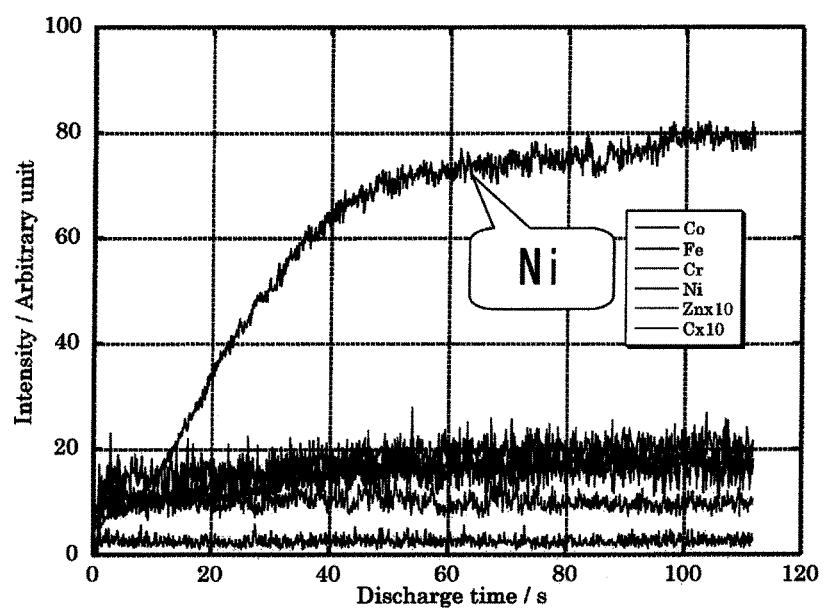
FIG. 8 is a view illustrating a GDS result of the INCONEL 600 specimen after the test T1→T2→T4.

FIGS. 5 to 8 show GDS results of the INCONEL 600 specimens. In the outermost surface layer of the specimens after the test 2T of FIG. 6, a portion where the Ni concentration is low is large, whereas in the specimens after the test T1→T2→T3 of FIG. 7 and after the test T1→T2→T4 of FIG. 8, an increase in the Ni concentration from the outermost surface layer of the oxide film starts (the rising edge of the graph is earlier). In the tests T1→T2→T3 and T1→T2→T4, the dispersant was added, and therefore the outermost surface layer of the oxide film may be peeled off.

From the evaluation, it is confirmed that the dispersant obtained by the present invention promotes the elution of metal element (Ni) to be the radiation source. Therefore, the effectiveness of the present invention is demonstrated.

The invention claimed is:

1. A radiation source reducing method for a nuclear power plant, comprising
    injecting a dispersant into a coolant of a coolant system of the nuclear power plant via a dispersant injecting unit;
    wherein the dispersant is polyacrylic acid having an average molecular weight in a range of 16000 to 26000, inclusive.

2. The radiation source reducing method for a nuclear power plant according to claim 1, wherein a concentration of the polyacrylic acid is in a range of 50 ppb to 1 ppm, inclusive.

3. The radiation source reducing method for a nuclear power plant according to claim 1, wherein the nuclear power plant is a pressurized water reactor-type nuclear power plant, and the coolant is a primary coolant in the pressurized water reactor-type nuclear power plant.

4. The radiation source reducing method for a nuclear power plant according to claim 1, wherein the dispersant does not contain an impurity component.

5. The radiation source reducing method for a nuclear power plant according to claim 4, wherein the impurity component is at least one component of sodium, chloride, sulfur, and fluorine.

* * * * *